Patented June 26, 1928.

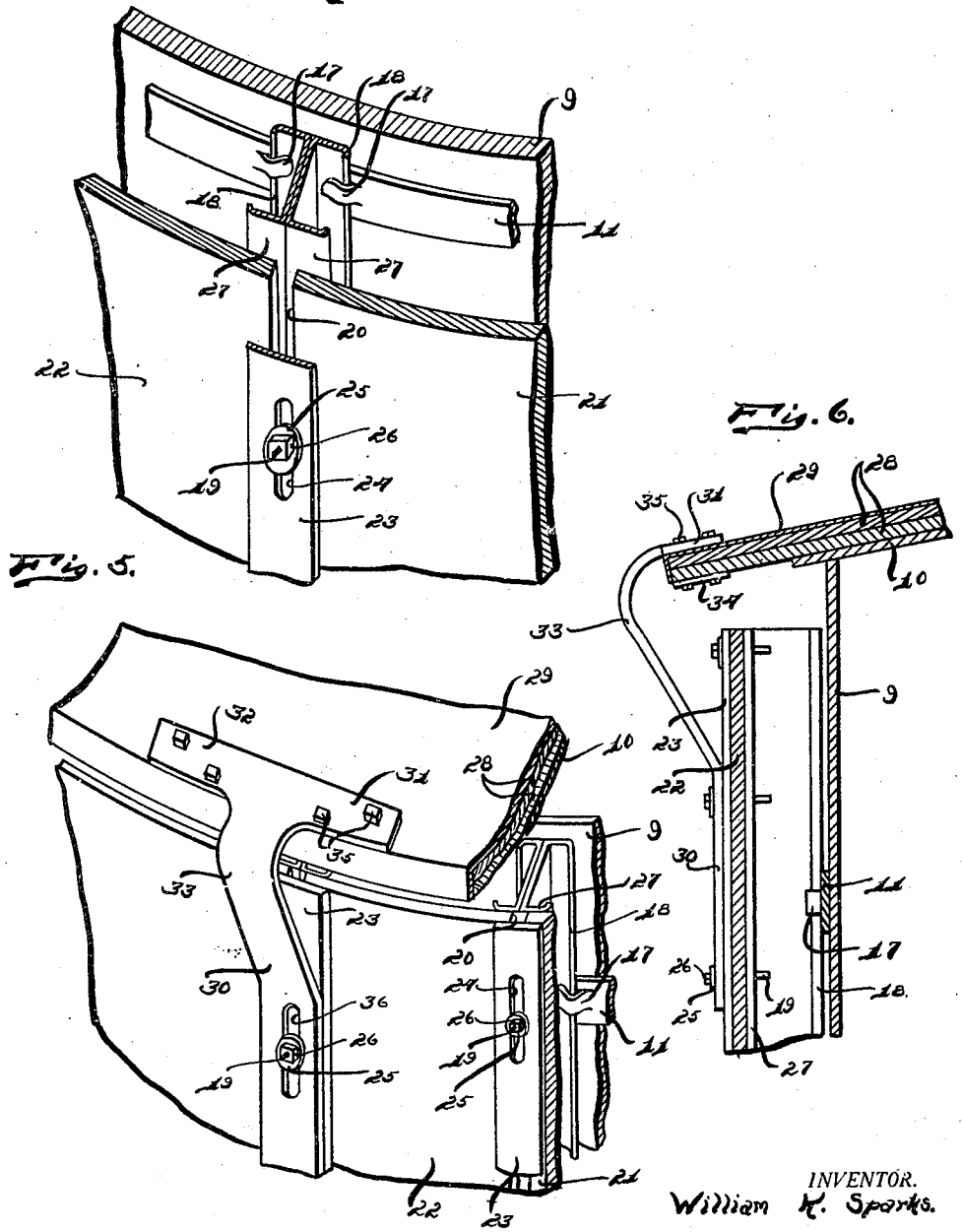

1,674,842

UNITED STATES PATENT OFFICE.

WILLIAM K. SPARKS, OF DETROIT, MICHIGAN.

TANK INSULATOR.

Application filed July 7, 1927. Serial No. 203,970.

My invention relates to a new and useful improvement in a tank insulator adapted for insuating tanks of various kinds such as oil tanks, alkali tanks, pickling vats, etc., against heat radiation or conduction. In the insulating of these tanks, particularly tanks of the type mentioned, it is desirable, since these tanks are generally formed from steel, that there be provided a means for attaching insulation to the tank whereby the perforation of the tank may be obviated, so that it is not necessary to punch or otherwise form holes in the tank, which would require considerable trouble in sealing.

It is an object of the invention to provide a means of this class whereby insulating material may be mounted upon the tank without requiring a mutilation or perforation of the tank.

Another object of the invention is the provision of a means for attaching insulating material to a tank of this class and retaining the same in spaced relation, thus permitting the desired air circulation, and at the same time, adding to the efficiency of the insulation used.

Another object of the invention is the provision of an attaching means for attaching insulation to the sides and to the roof of the tank, thus insulating the tank at all points.

Another object of the invention is the provision of a holding mechanism whereby the insulating material mounted on the roof of the tank may be securely held in position.

Another object of the invention is the provision of a mechanism whereby the insulating material may be easily and quickly applied to the tank.

Another object of the invention is the provision of attaching means for attaching insulation to a tank which may be simple in structure, economical of manufacture, durable and highly efficient in use.

Other objects will appear hereinafter.

The invention consists in the combination and arrangement of parts hereinafter described and claimed.

The invention will be best understood by a reference to the accompanying drawings which form a part of this specification and in which, Fig. 1 is a side elevational view of a tank showing the invention applied.

Fig. 4 is a fragmentary perspective view of the invention illustrating the various attaching means.

Fig. 5 is a fragmentary perspective view illustrating the mechanism for retaining the roof insulation in position.

Fig. 6 is a fragmentary sectional view taken on line 6—6 of Fig. 1.

Figure 1:
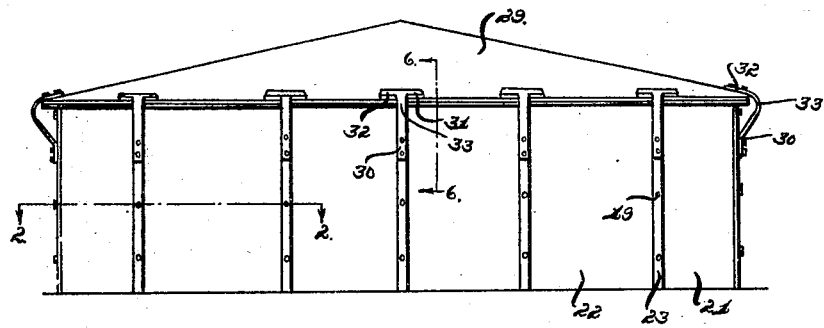
Figure 2:
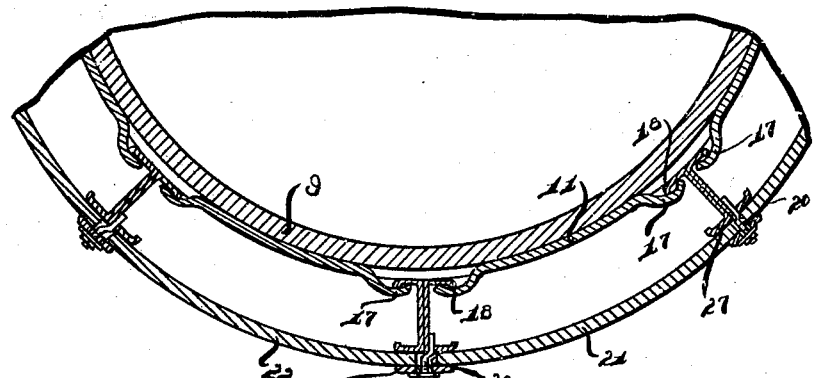
Fig. 2 is a fragmentary view taken on line 2—2 of Fig. 1.
Figure 3:
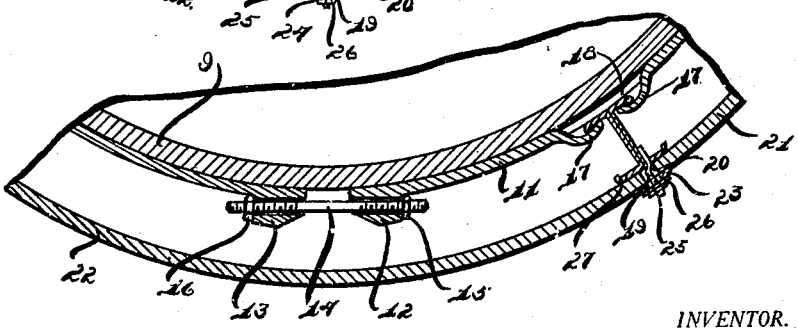
Fig. 3 is a fragmentary view similar to Fig. 2 showing the retaining securing means.

In the drawings I have illustrated the invention applied to a circular tank 9 having the roof 10 thereon which is upwardly inclined toward the center, this type of tank being one which is commonly used for storage of oil in the fields. The invention is generally applied to this tank as comprising a preferably metallic band 11 which is of such size as to embrace the tank 9 at desired positions. The band 11 is split and its ends provided with heads 12 and 13 through which may extend the bolt 14 upon which the nuts 16 and 15 may be threaded for clamping the band 11 tightly about the tank 9 so as to retain it in its desired position. Spaced tongues 17 are punched from the band 11 at desired intervals, these tongues being arranged in pairs which face each other and being outwardly offset slightly from the outer surface of the band 11. Vertically extending supporting members formed preferably of channel iron are adapted to be positioned bottom to bottom, as shown in Fig. 4, one of the flanges 18 of each of these channel irons being engaged by the tongues 17 so as to prevent lateral displacement of these vertically extending supports. Secured to and projecting outwardly from the supports thus formed are studs 19 adapted to project through the space 20 separating the edges of the adjacent arcuate strips 21 and 22 of insulating material. Extending in alignment with the supporting members formed from the channel irons are arcuate strips 23 formed preferably of metal and provied with elongated slots 24, through which the studs 19 project, a suitable washer 25 and a nut 26 being positioned on each of these studs so that the arcuate strips 23 serve as retaining members to clamp the edges of the insulating strips 21 and 22 in close engagement with the flanges 27 of the vertically extending supports formed from the channel irons.

The particular kind of material from which the insulating strips 21 and 22 are made may be determined by the particular kind of material contained within the tank, the location of the tank, climate, etc.

With the sealing band extended around the tank in this manner and the vertically extending supports, together with the binding strips, it is apparent that I have produced a simple and effective method of mounting insulating material on tanks of this class without perforating the tank, and at the same time, assuring a firm mounting of the insulating material in spaced relation to the tank. It will also be noted that from the structure of the attaching means used that the additional weight carried by the side walls of the tank is reduced to a minimum, while the supports are firmly held in position, and a dislodgment or displacement of the insulating material from the tank rendered, in normal conditions, practically impossible.

It is desirable to properly insulate the covering 10 of these tanks, as well as the side walls, and in the drawings I have illustrated the layers 28 of insulating material positioned on the roof with a suitable waterproof covering 29 mounted on the outer surface of the uppermost layer of insulating material. As clearly appears in Fig. 6, the upper end of the oil insulation is spaced from the outwardly projecting roof insulation to provide a space for the circulation of air. To retain this roof insulation in position I have provided a holder which is substantially T shaped comprising the trunk 30 with the laterally projecting arms 31 and 32, this trunk being angularly outwardly turned to provide the outwardly projecting portion 33 to accommodate the device to that structure in which the roof insulation extends outwardly beyond the outer edge of the oil insulation. A suitable wear plate 34 is mounted on the undersurface of the roof insulation and bolts 35 are projected through these laterally extending arms 31 and 32, as well as through the wear plate 34, thus serving to clearly attach the T shaped member to the roof insulation. Formed in the trunk 30 is an elongated slot 36 through which may be projected the upwardly positioned studs 19, the nut 26 and the washer 25 already described being used for the obvious purpose. This method of attaching the roof insulation to the vertically extending supports is one which assures a permanent mounting of the roof insulation in position and permits the economic attachment and securing of the same on the roof.

When it is desired to remove the insulation from a tank, the same may be removed without in any manner destroying or necessarily injuring any of the insulating material or the attaching parts. Consequently the insulating material may be removed from one tank when desired and used for insulating another tank.

Because of the method of attaching the insulating material on the tank, it becomes possible to, upon removing a single strip of the insulating material, have access to the tank for repairing, painting, or any other purpose. The bands 11 may be made sectional and in this manner the various parts may be made on a production basis as all the parts will be standardized and uniform and adapted for use on various sized tanks.

While I have illustrated and described the preferred form of my invention, I do not wish to limit myself to the precise details of structure shown, but desire to avail myself of such variations and modifications as come within the scope of the appended claims.

Having thus described my invention what I claim as new and desire to secure by Letters Patent is:

1. A device of the class described comprising: a retaining band adapted for mounting in embracing relation on a tank; vertically extending supports secured on said tank by said retaining member; securing means projecting outwardly from said supports; and clamping plates engageable with said securing means for clamping insulating material against said supports and retaining the same in fixed spaced relation to said tank.

2. In combination with a tank, a retaining member embracing said tank and clamped therein; a plurality of pairs of tongues punched from said retaining member and projecting outwardly therefrom in spaced relation, tongues of the same pair being faced inwardly toward each other; vertically extending supports engaging between said tongues and said band, said tongues serving to retain said supports in fixed relation to said tank; studs projecting outwardly from the outer face of said supports; insulating strips adapted for engaging at their vertically extending edges the outer faces of said supports; binding plates; means on said studs for clamping said insulating material between said binding plates and the outer faces of said supports.

3. A tank insulation of the class described comprising: a band embracing said tank and clamped in position thereon; a plurality of spaced pairs of outwardly projecting tongues on said band, the tongues on each pair being faced inwardly toward each other; vertically extending supports comprising a pair of oppositely faced channel members engaging each other, the inner flange of each of said channel members engaging between one of said tongues and said band; threaded members projecting outwardly from the outer face of said channel members; a plurality of insulating strips adapted for engaging at their vertically extended edges the outer faces of said channel members; binding plates adapted for overlapping adjacent edges of said insulating strips; and means on said threaded members for clamping said insulating strips between said binding members and the outer face of said channel members.

4. A tank insulation of the class described comprising: a retaining member embracing said tank and clamped thereon; vertically extending supporting members secured to said retaining member; insulating material extended around said tank and engaging the outer face of said supporting members; and means for clamping said insulating members on the outer face of said supporting members.

5. A tank insulation of the class described comprising: a retaining member embracing said tank and clamped thereon; vertically extending supporting members secured to said retaining member; insulating material extended around said tank and engaging the outer face of said supporting members; means for clamping said insulating members on the outer face of said supporting members; insulating layers positioned on the roof of said tank; and retaining members attached to said supporting members for engaging the outer edges of said roof insulation and retaining the same in position.

6. In a tank insulation construction of the class described adapted for use with a tank having a roof and vertically extending supporting members positioned exteriorly thereof, insulating material positioned on said roof; and means engaging the upper surface of said roof insulation and secured to said vertically extending supports for retaining said roof insulation in position.

7. A tank insulation construction of the class described adapted for use with a tank, comprising: a band embracing said tank and clamped thereon; a plurality of spaced pairs of outwardly pressed spaced tongues on said band, the tongues in each pair being faced inwardly; a plurality of vertically extending supports each comprising a pair of channel irons placed bottom to bottom and each having one of its side flanges engaging between said tongues and said band; studs projecting outwardly from the outwardly positioned flanges on said supporting members; a plurality of insulating strips adapted for engaging at the vertically extending edges the outer faces of said supporting members; clamping plates, each provided with elongated slots for the reception of said studs; and means threaded on said studs for clamping said plates against said insulating material to retain the same in engagement with said outer face of said supporting members.

8. In a tank insulation construction of the class described, a plurality of vertically extending supporting members; studs projecting outwardly from said supporting members; layers of insulating material positioned on the roof of the tank; T shaped retaining members having elongated slots formed in the trunk thereof adapted for the reception of said studs, said trunk being outwardly curved intermediate its arms and said slot, said arms being adapted for engaging the upper surface of said roof insulation; means for attaching said arms to said insulation; and means threaded on said studs for retaining said trunk in fixed relation to said tank.

9. In a tank insulation structure of the class described, insulating material extended around said tank in embracing relation; means for retaining said insulation material in spaced relation to the periphery of said tank; fastening means for securing said insulation in fixed relation to said tank, said insulation terminating below the upper end of said tank; insulating material on the roof of said tank projecting outwardly beyond the edges thereof and extending beyond the outer surface of said spaced insulation, said roof insulation being spaced from the upper end of said spaced insulation.

10. In a tank insulation structure of the class described, insulating material extended around said tank in embracing relation; means for retaining said insulation material in spaced relation to the periphery of said tank; fastening means for securing said insulation in fixed relation to said tank, said insulation terminating below the upper end of said tank; insulating material on the roof of said tank projecting outwardly beyond the edges thereof and extending beyond the outer surface of said spaced insulation, said roof insulation being spaced from the upper end of said spaced insulation; and means cooperating with said studs for retaining said roof insulation in fixed relation to said tank.

In testimony whereof I have signed the foregoing specification.

WILLIAM K. SPARKS.